United States Patent [19]

Jenkins et al.

[11] Patent Number: 4,995,893

[45] Date of Patent: * Feb. 26, 1991

[54] METHOD OF MAKING COATINGS ON GLASS SURFACES

[75] Inventors: Michael S. Jenkins, Nr. Preston; Andrew F. Simpson, Preston; David A. Porter, Merseyside, all of England

[73] Assignee: Pilkington plc, Merseyside, England

[*] Notice: The portion of the term of this patent subsequent to May 9, 2006 has been disclaimed.

[21] Appl. No.: 369,739

[22] Filed: Jun. 22, 1989

[30] Foreign Application Priority Data

Jun. 23, 1988 [GB] United Kingdom ............ 8814922.4

[51] Int. Cl.$^5$ .............................................. C03B 19/09
[52] U.S. Cl. ....................... 65/18.2; 65/3.12; 65/60.2; 65/60.5; 423/337; 423/336; 427/167; 427/255.3
[58] Field of Search ................ 65/3.12, 18.2, 60.2, 65/60.5; 427/167, 255.3; 423/336, 337

[56] References Cited

U.S. PATENT DOCUMENTS

| | | | |
|---|---|---|---|
| 4,188,444 | 2/1980 | Landau | 428/428 |
| 4,206,252 | 6/1980 | Gordon | 427/255.3 |
| 4,374,157 | 2/1983 | Barbier et al. | |
| 4,661,381 | 4/1987 | Callies et al. | 427/166 |
| 4,801,515 | 1/1989 | Iino et al. | 430/66 |
| 4,810,673 | 3/1989 | Freeman | 427/255.3 |
| 4,828,880 | 5/1989 | Jenkins et al. | 65/60.8 |

FOREIGN PATENT DOCUMENTS

| | | |
|---|---|---|
| 2545983 | 11/1984 | France . |
| 1104935 | 3/1968 | United Kingdom . |
| 1449789 | 9/1976 | United Kingdom . |
| 1550215 | 8/1979 | United Kingdom . |
| 2031756 | 4/1980 | United Kingdom . |
| 2035986 | 6/1980 | United Kingdom . |
| 2058731 | 4/1981 | United Kingdom . |
| 2163146 | 2/1986 | United Kingdom . |
| WO87/00685 | 1/1987 | World Int. Prop. O. . |

*Primary Examiner*—Richard V. Fisher
*Assistant Examiner*—John J. Bruckner
*Attorney, Agent, or Firm*—Burns, Doane, Swecker & Mathis

[57] ABSTRACT

Coatings, which act as barrier layers to inhibit migration of alkali metal ions from a glass surface and/or act as color suppressing underlayers for overlying infra-red reflecting or electrically conducting layers, are deposited by pyrolysis of a gaseous mixture of a silane, an unsaturated hydrocarbon and an oxygen-containing gas other than carbon dioxide which does not react with the silane at room temperature on a hot glass surface at a temperature of 600° C. to 750° C.

10 Claims, No Drawings

METHOD OF MAKING COATINGS ON GLASS SURFACES

The invention relates to coatings, and in particular to the production of underlayers useful in the suppression of iridescence and in the protection of overlying layers sensitive to alkali metal ions from migration of such ions from an underlying glass surface.

G.B. patent No. 2 031 756B is concerned with thin transparent infra-red reflecting semiconductor coatings which are useful in improving the insulation properties of windows and which, being electrically conductive, can serve as resistance heaters, for example to remove ice or condensation from windows. According to GB No. 2 031 756B, the use of such coatings has been limited by the fact that they exhibit iridescence colours, especially in reflected light; these iridescence effects are widely regarded as aesthetically unsatisfactory., and the problem is made worse by the variation in iridescence colour which occurs with shall variations in coating thickness. GB No. 2 031 756B proposes to overcome the problem of iridescence by depositing an appropriate iridescence reducing underlayer under the semiconductor coating and recommends, as a preferred form of underlayer, a layer having a refractive index in the range from 1.7 to 1.8 and a thickness in the range 64 nm and to 80 nm. According to GB No. 2 031 756B, the underlayers may be produced by co-depositing a mixture of components calculated to provide the required refractive index, for example a mixture of 84±3% silicon nitride and the balance silica, referred to as silicon oxynitride.

Such silicon oxynitride films may be formed by chemical vapour deposition from a source of silicon (e.g. $SiH_4$, $(CH_3)_2SiH_2$, $(C_2H_5)_2SiH_2$, $(CH_3)_4Si$, $SiCl_4$, $SiBr_4$), a source of oxygen (e.g. $O_2$, $H_2O$, $N_2O$) and a source of nitrogen (e.g. $N_2H_4$, $NH_3$, $HN_3$, $CH_3NHNH_2$, $(CH_3)_2NNH_2$) or a source of both oxygen and nitrogen (NO, $NH_2OH$, $N_2H_4 H_2O$) on hot glass at a temperature of 500° C. to 600° C.

However, although there is a requirement for a suitable iridescence reducing underlayer, the underlayers proposed in GB patent No. 2 031 756B have not been used commercially to any significant extent. This may be because of difficulties, in particular the long deposition time required, in producing underlayers of sufficient quality and thickness by the known methods.

GB patent specification No. 2 163 146A is concerned with the production of barrier coatings on a glass surface to prevent migration of alkali metal ions from the glass into an overlying layer sensitive to alkali metal ions, for example indium tin oxide. It describes the production of transparent barrier coatings, having good light transmission and excellent barrier properties by pyrolysis of silane on a hot glass surface above 600° C. in the presence of a gaseous electron donating compound; the presence of the electron donating compound is found to result in incorporation of oxygen from glass into the coating so forming a transparent barrier coating up to 50 nm thick on the glass surface.

The electron donating compounds which may be used in the process of GB patent specification No. 2 163 146A are compounds which contain, either in bonds or as lone pair electrons, electrons which can be donated into the electronic structure of suitable acceptor molecules. The use of the electron donating compound is found to result in the incorporation of oxygen from the glass with silicon from the silane to form the transparent barrier coating on the glass. Although the mechanism is not understood, it is believed to involve adsorption of the electron donating compound on the glass surface. It is preferred to use an electron donating compound which is oxygen free, for example ethylene, or which, although it contains some oxygen, is generally regarded as reducing, for example carbon monoxide and alcohols.

Because the transparent barrier coatings may be prepared in the absence of free oxygen and compounds generally regarded as oxidising agents, the barrier coating may be applied to a ribbon of float glass as it is advanced over the molten metal bath on which it is formed without undue risk of oxidising the molten metal.

Unfortunately, while the use of oxygen free electron donating compound alleviates the risk of the silane being oxidised before it reaches the glass surface and of the reactant gas oxidising a molten metal bath on which the glass ribbon is supported, there is insufficient oxygen availability from the glass for the formation of the thicker iridescence reducing underlayers recommended in GB patent No. 2 031 756B. While thicker layers may be produced by using oxygen-containing electron donating compounds, for example carbon dioxide, it is found that the use of a combination of silane and carbon dioxide results in either thin coatings of poor durability or, when attempts are made to thicken the coatings, a white hazy deposit.

Moreover, when attempts are made to produce barrier coatings of very high transparency (e.g. a light transmission not less than 2% below that of the base glass) using a combination of silane and ethylene in accordance with GB No. 2 163 146A, the barrier properties of the coatings were found to be insufficiently consistent for some applications.

Our pending unpublished GB Patent Application No. 8729171 describes a process in which a gaseous mixture of a silane, an ethylenically unsaturated hydrocarbon and carbon dioxide is directed on to a hot glass surface to deposit a coating containing silicon and oxygen on the glass surface. We have found that this process is one which is suitable for commercial operation on a float glass production line, for producing an iridescence reducing underlayer as recommended in GB patent No. 2 031 756B or alternatively for producing coatings which are effective as barriers to the migration of alkali metal ions from the glass and have a very high degree of transparency.

We have now found that if carbon dioxide in the said gaseous mixture is replaced by another oxygen-containing gas which does not react with silane at room temperature it is also possible to produce coatings which are effective as barriers to the migration of alkali metal ions from the glass and have a very high degree of transparency in a process which is suitable for commercial operation on a float glass production line, or alternatively that it is possible to produce by this process during commercial operation on a float glass production line, an iridescence reducing underlayer as recommended in GB patent No. 2031756B.

Accordingly, the present invention provides a process for forming a useful underlayer on a glass surface comprising directing on to the hot glass surface at a temperature of 600° C. to 750° C. a gaseous mixture of a silane, an unsaturated hydrocarbon compound and an oxygen containing gas other than carbon dioxide which does not react with the silane at room temperature thereby depositing a transparent layer containing silicon and oxygen on the glass surface.

Underlayers produced by the process of the invention act as barriers to the migration of alkali metal ions from the glass and are useful when an overlying layer, sensitive to the migration of alkali metal applied directly or indirectly over the underlayer. According to a further aspect of the invention, the process additionally comprises the step of applying a layer, sensitive to the migration of alkali metal ions from the glass, over the underlayer. The overlayer may be of a semiconductor metal oxide, for example tin doped indium oxide. The underlayers of the present invention will usually be used as barrier layers on flat glass having a thickness of up to 2 mm.

To produce an infra red reflecting and/or electrically conducting coating of reduced iridescence, an infra-red reflecting and/or electrically conducting layer is deposited over the underlayer. Thus, according to a still further aspect of the invention, the process additionally comprises the step of depositing an infra red reflecting and/or electrically conducting layer over the underlayer. This overlayer may be of a semiconductor metal oxide, for example tin doped indium oxide or doped tin oxide, especially fluorine doped tin oxide. The underlayers of the present invention will usually be used as colour suppressing layers on flat glass 3 mm thick or thicker, especially glass having a thickness in the range 3 mm to 6 mm.

Both the underlayer and the overlayer may be applied to float glass on the production line on which it is made. In this case the overlayer may be a fluorine doped tin oxide layer deposited by pyrolytic decomposition from a solid (as described, for example, in GB patent specification No. 2 156 386B), liquid (as described, for example, in GB patent specification No. 1 523 991) or vapour source (for example, gaseous stannic chloride in the presence of water vapour and hydrogen fluoride). The decomposition may be carried out adjacent the entrance to the lehr. When the overlayer is applied away from the production line on which the glass is made, it may be applied by the techniques referred to above or, more usually, by other known techniques such as sputtering.

When the coating is to be used as an infra red reflecting coating, the infra red reflecting layer will usually have a thickness in the range 200 nm to 500 nm. Thicker layers, for example up to 1000 nm, may be used if desired but are generally unnecessary in view of the iridescence reducing properties of the underlayer. When the coating is to carry an electrical current, for example in a resistance heater or a liquid crystal display, the thickness of the coating will depend on the electrical conductivity required but will typically be in the range 100 nm to 1000 nm.

The oxygen containing gas for use in the process of the present invention is preferably a compound which does not react with the silane to be used (usually monosilane) at room temperature and, for convenience of use, is either gaseous at room temperature or has a vapour pressure of at least 10 mm at room temperature.

Examples of gases which may be used include gaseous oxides such as carbon monoxide, water vapour, sulphur dioxide and the oxides of nitrogen (nitrous oxide, nitric oxide or nitrogen dioxide) and olefin oxides especially ethylene oxide.

Further examples are organic oxygen containing compounds including carbonyl compounds (especially ketones and aldehydes), ethers and alcohols. As indicated above it is generally most convenient to use a compound which has a vapour pressure of at least 10 mm at room temperature, and for this reason it is therefore usual for any oxygen containing organic compound used to contain not more than 8, and preferably not more than 4, carbon atoms.

The colour suppressing underlayers produced in accordance with the invention should have a thickness of at least 55 nm, preferably at least 60 nm; in order to form underlayers of such thickness, having a refractive index of less than 1.8 by an on line process, it is desirable to use an oxygen containing gas which is more strongly oxidising than carbon monoxide.

The oxygen containing gases used in the process of the present invention are used in place of carbon dioxide as described in GB patent application No. 8729171, so that the gaseous mixture used in accordance with the invention will generally be substantially free from carbon dioxide.

The silane is preferably monosilane ($SiH_4$), although other substituted or unsubstituted silanes in gaseous form e.g. dimethylsilane $(CH_3)_2SiH_2$ and disilane $Si_2H_6$, may be used if desired.

The unsaturated hydrocarbon may be an ethylenically unsaturated hydrocarbon compound, an acetylenically unsaturated compound (for example acetylene) or an aromatic compound (for example toluene), although it is generally most convenient to use an unsaturated hydrocarbon which is gaseous under ambient conditions. The unsaturated hydrocarbon is preferably an olefin, conveniently an olefin containing 2 to 4 carbon atoms. Ethylene is especially preferred.

The proportions of the component gases present in the gaseous mixture and the flow rate of the gaseous mixture over the glass may be regulated to provide an underlayer of a desired thickness and refractive index.

The oxygen-containing gas acts as a source of oxygen so that, although there is only limited availability of oxygen from the glass surface, transparent layers having a thickness up to 80 nm as taught by GB patent No. 2 031 756B can readily be achieved. Moreover, by appropriate regulation of the relative proportions of the component gases present, an underlayer having a refractive index in the range 1.7 to 1.8 taught by GB patent No. 2 031 756B can be achieved. In a preferred aspect of the invention, the proportions of the component gases present in the gaseous mixture used to deposit the underlayer and the flow rate of the gaseous mixture over the hot glass are regulated to deposit an underlayer having a thickness in the range 60 nm to 80 nm and a refractive index in the range 1.6 to 1.8.

In another embodiment of the invention, the proportions of the components gases present in the gaseous mixture used to deposit the underlayer and the flow rate of the gaseous mixture over the hot glass are regulated to deposit an underlayer which has a thickness and refractive index such that the glass coated with the underlayer has a light transmission within 2% of the light transmission of the uncoated glass and which provides an effective barrier to migration of alkali metal ions from the glass. The light transmission of the coated glass is preferably within 1% of the light transmission of the base glass. By the expression "effective barrier" it is meant that, on testing by the method described herein, the underlayer allows the passage of not more than 100 (and preferably not more than 60) micrograms of sodium expressed as $Na_2O$ per square decimeter of glass.

The barrier layers of the present invention are especially useful on flat glass up to 2 mm thick and preferably up to 1.5 mm thick.

In general, the higher the ratio of unsaturated hydrocarbon to silane, the thinner the coatings and the lower the refractive index of the coating. It is generally preferred to operate at a ratio of unsaturated hydrocarbon:silane in the range 2:1 to 5:1 by volume, although ratios outside this range, for example, 1:1 to 8:1 (or even higher) may be used. The unsaturated hydrocarbon is believed to act by being adsorbed on the glass surface so that, in general, the more strongly the unsaturated hydrocarbon is adsorbed on the glass, the lower the proportion of unsaturated hydrocarbon to silane is required for a given affect. The ratio of oxygen containing gas to silane is preferably in the range 2:1 to 8:1 by volume, although ratios outside this range, for example 1:5 to 20:1 (or even higher) may be used. The higher ratios will generally only be used when operating at very low silane concentrations.

The ratio of oxygen containing gas to unsaturated hydrocarbon will generally be in the range 1:20 to 5:1, especially 1:10 to 2:1% by volume.

The gaseous mixture used will generally contain an inert carrier gas, for example nitrogen, in an amount of, for example, 10% to 90% by volume of the gaseous mixture.

In order to avoid premature reaction of the silane, the gaseous mixtures should be substantially free from molecular oxygen and other strongly oxidising gases which react with the silane at room temperature.

Increasing the total flow rate of a gaseous mixture of given composition results, as might be expected, in an underlayer of increased thickness. It has also been found to result in an underlayer of higher refractive index.

The glass is preferably at a temperature in the range 630° C. to 720° C.

The process of the present invention facilitates the on-line production of iridescence reducing underlayers and underlayers which serve as a barrier to the migration of alkali metal ions and have a very high degree of transparency to visible light. Moreover, as the reactants used are not strongly oxidising the process can be applied to a ribbon of float glass as it is advanced over the molten metal bath on which it is formed without undue risk of oxidising the molten metal.

The invention is illustrated but not limited by the following Examples. In the Examples, all percentages are by volume unless otherwise indicated, and the gas flow rates are measured at 69 kPa (10 psi) and approximately 20° C. The refractive index and thickness values quoted for the underlayer are calculated, applying thin film theory, from the wavelength and magnitude of maximum reflection of the underlayer. The light transparency of the coated glass is expressed as dT, which is the difference between the percentage light transmission of the glass coated with the underlayer and the percentage light transmission of the uncoated glass. The effectiveness of the underlayers as barrier layers to the migration of alkali metal ions was determined by the following procedure. Two samples of the coated glass, each 10 cm square, were cut and clamped together with an annular silicone rubber ring of internal diameter 8.5 cm between them to form a cylindrical cell with its walls defined by the coated surface of the glass and the inner surface of the silicone rubber ring. The cell was filled with de-ionised water through a hole in the rubber ring, the hole sealed and the sealed cell immersed in a water bath at 96° C. for 48 hours. The solution was removed and analysed for sodium by flame emission spectroscopy. The sodium extract was determined and expressed as micrograms of $Na_2O$ per square decimeter of glass exposed to the water in the cell.

EXAMPLE 1

A ribbon of 6 mm float glass advancing at a lehr speed of 540 meters per hour was coated with an underlayer by applying a gaseous mixture to the upper surface of the glass as it advanced over the float bath at a position where the glass temperature was about 680° C. The gaseous mixture comprised 4.6% monosilane, 38.5% ethylene, 38.5% carbon monoxide and 18.4% nitrogen as a carrier gas. The gaseous mixture was caused to flow parallel to the glass surface in the direction of movement of the glass under laminar flow conditions using an apparatus as described in G.B. patent specification No. 1 507 966, modified to extend the path of travel of the gaseous mixture over the glass surface to approximately 0.2 m. The flow rate of the gaseous mixture was 130 liters per minute per meter width of glass coated.

A clear, substantially haze free, underlayer was formed on the glass surface. The underlayer exhibited a good barrier performance to the migration of alkali metal ions from the glass (as manifest by a value micrograms $Na_2O/dm^2=20$) and had a high degree of transparency relative to the transparency of uncoated glass (dT=1%).

EXAMPLES 2 AND 3

These Examples illustrate the use of dimethylether as the oxygen-containing gas, with silane and ethylene, to produce colour suppressing underlayers in accordance with the invention. The Examples were carried out by the procedure described in Example 1. The gas composition and gas flow rates used, and the properties of the underlayers produced, are set out in Table 1.

The underlayer of Example 2 had a thickness of 56 nm and a refractive index of 1.7, while the underlayer of Example 3 had a thickness of 53 nm and a refractive index of 1.82. These values indicate that satisfactory colour suppressing underlayers can be achieved using a gaseous mixture of dimethylether, silane and an unsaturated hydrocarbon.

TABLE 1

| EXAMPLE | GAS COMPOSITION (%) | | | | GAS FLOW (liters/min/ meter width) | microgram $Na_2O$/ sq dm | UNDERLAYER | |
| --- | --- | --- | --- | --- | --- | --- | --- | --- |
| | $SiH_4$ | $C_2H_4$ | $CH_3O CH_3$ | $N_2$ | | | Refractive Index | Thickness (nm) |
| 2 | 5.5 | 36 | 36 | 22.5 | 110 | 15 | 1.7 | 56 |
| 3 | 6.7 | 33.3 | 33.3 | 26.7 | 90 | 21 | 1.82 | 53 |

EXAMPLES 4 TO 13

Static samples of float glass, 10 cm by 10 cm, were coated in the laboratory by heating the glass in a silica tube at a temperature of about 625° C. and passing a coating gas comprising a mixture of silane, an oxygen-containing gas, ethylene and nitrogen over the hot glass surface. 3 mm float glass was used in Examples 4 to 7; 1.1 mm float glass was used in Examples 8 to 13. The gas compositions used and treatment times are shown in Table 2, together with the results of measurements on the light transmission and barrier properties of the coated products. With each of the oxygen-containing gases used except carbon monoxide, a good barrier performance was achieved with a high degree of transparency (within 1% of the transparency of the uncoated glass or better). A good barrier performance was achieved with carbon monoxide, but the light transmission of the coated glass, while still over 77%, was significantly reduced. Four of the oxygen-containing gases; acetone, methanol, sulphur dioxide and nitrogen dioxide gave antireflective coatings which improved the transmission of the glass sheet.

proximately 20° C. thereby depositing a transparent layer containing silicon and oxygen on the glass surface.

2. A process as claimed in claim 1, wherein the oxygen-containing gas is carbon monoxide.

3. A process as claimed in claim 1, wherein the oxygen-containing gas is an organic compound chosen from acetone, dimethylether, acetaldehyde and methanol.

4. A process as claimed in claim 1, wherein the oxygen-containing gas is ethylene oxide.

5. A process as claimed in claim 1, wherein the unsaturated hydrocarbon compound used in depositing the underlayer is an olefin containing 2 to 4 carbon atoms.

6. A process as claimed in claim 5, wherein the unsaturated hydrocarbon compound is ethylene.

7. A process as claimed in claim 1, which additionally comprises the step of depositing an infra-red reflecting

TABLE 2

| EXAMPLE | Monosilane % | Ethylene % | Oxygen Containing Gas % | nitrogen % | coating time (seconds) | total Gas flow (l/min) | dT % | microgram $Na_2O$/ sq dm |
|---|---|---|---|---|---|---|---|---|
| 4 | 0.1 | 1.4 | 1.1 dimethylether* | 97.4 | 30 | 20.7 | 0.3 | 18 |
| 5 | 0.3 | 1.4 | 0.5 acetone* | 97.8 | 60 | 22 | 0.5# | 18 |
| 6 | 0.2 | 1.4 | 1.8 methanol* | 96.5 | 30 | 21.8 | 0.6# | 4 |
| 7 | 0.5 | 2.0 | 0.2 ethylene oxide | 97.3 | 30 | 19 | 0 | 13 |
| 8 | 1.8 | 5.5 | 3.6 $SO_2$ | 89 | 60 | 5.5 | 0.6# | 70 |
| 9 | 1.8 | 5.8 | 5.8 $N_2O$ | 87 | 10 | 5.7 | 0.9 | 26 |
| 10 | 1.8 | 5.2 | 8.4 $N_2O$ | 84 | 20 | 5.8 | 0.2 | 33 |
| 11 | 2.8 | 8.9 | 8.9 CO | 79.4 | 60 | 3.6 | 14.0 | 46 |
| 12 | 2.8 | 9.0 | 9.0 $NO_2$ | 79.2 | 30 | 3.6 | 1.1# | 7 |
| 13 | 1.8 | 6.0 | 1.0 $NO_2$ | 91.2 | 30 | 5.4 | 0.9# | 31 |

*The gas was obtained by bubbling nitrogen through the liquid compound and the amount of gaseous compound present in the gaseous mixuture calculated from the known vapour pressure of the liquid assuming a bubbler efficiency of 50% i.e. that the nitrogen bubbled through the liquid compound became 50% saturated with the vapourised compound.
In this case, the coated glass had a higher light transmission than the uncoated glass.

EXAMPLE 14

The procedure of Example 4 was repeated using a gaseous mixture containing 0.5 silane, 1.0 ethylene, 0.3% acetone and 98.2% nitrogen flowing at a total rate of 21.5 liters per minute.

The glass was found to be coated with a layer having a high degree of transparency, having a refractive index of 1.71 and a thickness of 60 nm, indicating a satisfactory performance as a colour suppression layer.

The coatings produced as described in the Examples had good alkali resistance, and were suitable as underlayers for applications of overlayers of semiconductor metal oxide in known manner.

What is claimed is:

1. A process for forming an underlayer on a glass surface comprising directing on to the hot glass surface at a temperature of 600° C. to 750° C. a gaseous mixture of a silane, an unsaturated hydrocarbon compound and an oxygen-containing gas other than carbon dioxide which does not react chemically with the silane at apand/or electrically conducting layer over the underlayer.

8. A process as claimed in claim 1, which additionally comprises the step of depositing a layer of semi-conductor metal oxide over the underlayer.

9. A process as claimed in claim 1, wherein the proportions of the component gases present in the gaseous mixture used to deposit the underlayer and the flow rate of the gaseous mixture over the hot glass surface are regulated to deposit an underlayer having a thickness in the range 60 nm to 80 nm and a refractive index in the range 1.6 to 1.8.

10. A process as claimed in claim 1, wherein the proportions of the component gases present in the gaseous mixture used to deposit the underlayer and the flow rate of the gaseous mixture over the hot glass surface are regulated to deposit an underlayer which has a thickness and refractive index such that the glass coated with the underlayer has a light transmission within 2% of the light transmission of the uncoated glass and which provides an effective barrier, as herein defined, to migration of alkali metal ions from the glass.

* * * * *